US012710513B2

(12) United States Patent
Tao et al.

(10) Patent No.: US 12,710,513 B2
(45) Date of Patent: Aug. 18, 2026

(54) DETECTION DEVICE OF LIDAR, LIDAR, AND DETECTION METHOD THEREFOR

(71) Applicant: Hesai Technology Co., Ltd., Shanghai (CN)

(72) Inventors: Jun Tao, Shanghai (CN); Xuezhou Zhu, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 925 days.

(21) Appl. No.: 17/939,604

(22) Filed: Sep. 7, 2022

(65) Prior Publication Data

US 2023/0003850 A1 Jan. 5, 2023

Related U.S. Application Data

(63) Continuation of application No. PCT/CN2021/078774, filed on Mar. 2, 2021.

(30) Foreign Application Priority Data

Mar. 24, 2020 (CN) ......................... 202010211446.4

(51) Int. Cl.
*G01S 7/4863* (2020.01)
*G01S 7/48* (2006.01)
(Continued)

(52) U.S. Cl.
CPC .......... *G01S 7/4863* (2013.01); *G01S 7/4808* (2013.01); *G01S 7/4816* (2013.01); *G01S 7/4865* (2013.01); *G01S 17/10* (2013.01)

(58) Field of Classification Search
CPC .... G01S 7/4863; G01S 7/4808; G01S 7/4816; G01S 7/4865; G01S 17/10; G01S 7/487;
(Continued)

(56) References Cited

U.S. PATENT DOCUMENTS 10,571,574 B1 2/2020 Yavid
2018/0341009 A1 11/2018 Niclass et al.
(Continued)

FOREIGN PATENT DOCUMENTS

CN 107121683 A 9/2017
CN 108431626 A 8/2018
(Continued)

OTHER PUBLICATIONS

Patent Cooperation Treaty, International Search Report, International Application No. PCT/CN2021/078774 (Jun. 4, 2021).
(Continued)

*Primary Examiner* — Isam A Alsomiri
*Assistant Examiner* — Joseph C Fritchman
(74) *Attorney, Agent, or Firm* — Leydig, Voit & Mayer, Ltd.

(57) ABSTRACT

A detection device of a light detection and ranging (lidar) device, a detection method, and a lidar device are provided. The detection device predicts the location of light spots of a reflected echo on a detector array, and reads electric signals of a subset of the photodetectors corresponding to the light spots. According to the detection method, the location on a detector array for light spots of a reflected echo is predicted according to a time of flight of a detection beam, a subset of the photodetectors corresponding to the light spots are activated, and their electric signals are read. All received light is detected, without increasing the receiving field of view, ambient light interference is suppressed, and the problem of shift of the light spots on a focal plane caused by optical path distortion is effectively solved.

13 Claims, 8 Drawing Sheets

(51) Int. Cl.
*G01S 7/481* (2006.01)
*G01S 7/4865* (2020.01)
*G01S 17/10* (2020.01)

(58) Field of Classification Search
CPC ........ G01S 7/4815; G01S 17/89; G01S 17/42; G01S 17/02; G01S 7/4866; G01S 7/4814; H01S 5/183
See application file for complete search history.

(56) References Cited

U.S. PATENT DOCUMENTS

2021/0382151 A1* 12/2021 McCord ................ G01S 7/4817
2022/0120906 A1* 4/2022 Pacala ...................... H03K 3/42
2022/0350027 A1* 11/2022 Nishino ................ G01S 17/931

FOREIGN PATENT DOCUMENTS

CN 109164430 A 1/2019
CN 109313256 A 2/2019
CN 109375191 A 2/2019
CN 109474771 A 3/2019
CN 110780284 A 2/2020
WO WO-2017112416 A1 * 6/2017 ........... G01S 7/4863

OTHER PUBLICATIONS

Patent Cooperation Treaty, Written Opinion of the International Searching Authority, International Application No. PCT/CN2021/078774 (Jun. 4, 2021).

* cited by examiner

DETECTION DEVICE OF LIDAR, LIDAR, AND DETECTION METHOD THEREFOR

CROSS-REFERENCE TO RELATED APPLICATIONS

This application is a continuation of International Application No. PCT/CN2021/078774, filed on Mar. 2, 2021, which claims priority to Chinese Patent Application No. 202010211446.4, filed on Mar. 24, 2020, which is incorporated herein by reference in its entirety.

TECHNICAL FIELD

The present disclosure generally relates to the technical field of laser detection, and in particular, to a detection unit capable of dynamically adjusting a photosensitive surface, a light detection and ranging (lidar) device including a detection device, and a detection method of the lidar.

BACKGROUND

A lidar system includes a laser emitting system and a detection receiving system. When the emitted laser encounters the target, itis reflected and then received by the detection system. The distance between the target and the lidar may be determined by measuring the time period between emission and reception (time-of-flight method). And a three-dimensional image may be finally achieved after scanning and detecting are performed on the entire target region. As a common ranging sensor, a lidar has the advantages of long detection distance, high resolution, robust anti-active interference capability, small volume, and light weight, and has been widely applied to the fields such as intelligent robots, unmanned aerial vehicles, or unmanned driving technologies.

Currently, in lidar's real applications, as an emitting optical path and a receiving optical path have different axes, the locations of light spots imaged on the detector are different at different reflection distances. For a coaxial lidar (such as scanning galvanometer lidar or similar field-of-view scanning lidar), a light spot drift may occur due to slight rotation of scanning galvanometer during the period of laser emission and reception within the time of flight. In addition, shift of light spot on the detector may also occur due to mechanical deformation resulting from hardware aging, glue deformation, and thermal expansion and cold contraction inside the lidar device. To solve these problems, the photosensitive area on the detector needs to be enlarged to ensure that the light spot always drifts within the photosensitive region of the detector.

However, the enlargement of the photosensitive area of the detector will increase field of view of the receiving optical path, which, in turn, increases ambient light received by detector and weakens the capability of the system to suppress the ambient light. In addition, the enlargement of the photosensitive area of the detector will also increase dark current/dark count, resulting in a reduced capability of the system to detect small signals.

Currently, the detector commonly used by lidar is an avalanche photodiode (APD). The size of the photosensitive surface of the APD is fixed, and as a result, it is impossible to realize dynamic adjustment.

The content of the background merely represents technologies known to the inventor, and does not necessarily represent the conventional technologies in this field.

SUMMARY

In view of at least one defect in the conventional technologies, the present disclosure provides a detection unit of a lidar, a lidar including the detection unit, and a detection method of the lidar.

The present disclosure provides a detection unit of a lidar, including:

a detector array, including a plurality of individually addressable photodetectors, where the photodetector is configured to receive an echo of a detection beam emitted by the lidar and reflected by a target object, and convert the echo into an electric signal; and a control unit, coupled to the detector array, and configured to predict a location on the detector array for a light spot of the echo of the detection beam reflected by the target object according to a time of flight of the detection beam emitted by the lidar, and read electric signals of a subset of the photodetectors corresponding to the light spot.

According to an aspect of the present disclosure, the photodetector includes a single-photon detector, the detection unit further includes a plurality of address lines respectively corresponding to and connected to the plurality of photodetectors, and the control unit is electrically connected to the plurality of photodetectors through the plurality of address lines for reading the electric signals.

According to an aspect of the present disclosure, the plurality of photodetectors remain in an activated state during operation of the lidar.

The present disclosure provides a detection unit of a lidar, including:

a detector array, including a plurality of individually addressable photodetectors, where the photodetector is configured to receive an echo of a detection beam emitted by the lidar and reflected by a target object, and convert the echo into an electric signal; and a control unit, coupled to the detector array, and configured to predict a location on the detector array for a light spot of the echo of the detection beam reflected by the target object according to a time of flight of the detection beam emitted by the lidar, energize only a subset of the photodetectors corresponding to the light spot to be in an activated state, and read electric signals of the subset of the photodetectors.

According to an aspect of the present disclosure, the detection unit further includes: a drive circuit for each photodetector, where the drive circuit includes a Zener diode, the photodetector is connected to a drive voltage through the Zener diode; the drive circuit further includes a switching device coupled at two ends of the Zener diode, the switching device is coupled to the control unit, and on or off of the switching device is controlled by the control unit; and when the switching device is turned on, the Zener diode is short-circuited and the photodetector is activated; and when the switching device is turned off, the Zener diode is not short-circuited, and the photodetector is disabled.

According to an aspect of the present disclosure, the photodetector includes a single-photon detector, the detection unit further includes a plurality of address lines respectively corresponding to and connected to the plurality of photodetectors, and the control unit is electrically connected to the plurality of photodetectors through the plurality of address lines for reading the electric signals.

The present disclosure further provides a lidar, including the detection unit as described above.

According to an aspect of the present disclosure, the lidar further includes:

a laser emitter, configured to emit a laser beam for detecting a target object;

an emitting lens, located downstream of an optical path of the laser emitter, and configured to receive the laser beam, modulate the laser beam and emit the modulated laser beam to outside of the lidar; and a receiving lens, configured to receive an echo of the laser beam emitted by the laser emitter and reflected by the target object and converge the echo onto the detector array, where the detector array is located on a focal plane of the receiving lens.

According to an aspect of the present disclosure, the location $(x_t, y_t)$ on the detector array for the light spot of the echo of the detection beam reflected by the target object is determined by the control unit according to the following formulas:

$$x_t = 2\frac{f}{C*t*\cos\theta}h_x + x_0$$

$$y_t = 2\frac{f}{C*t*\cos\theta}h_y + y_0$$

where $(x_0, y_0)$ is a light spot origin location, the light spot origin location is a location on the detector array for a light spot of an echo reflected by the target object from an infinite distance, f is a focal length of the receiving lens, C is a speed of light, t is a time of flight calculated starting from a moment when the laser emitter emits a pulse, θ is an angle between the laser beam emitted by the laser emitter and an optical axis of the receiving lens, and $(h_x, h_y)$ is a distance component between the emitting lens and the receiving lens in an x-axis and a y-axis.

According to an aspect of the present disclosure, the lidar further includes:

a laser emitter, configured to emit a laser beam for detecting a target object;

a field of view scanning apparatus, configured to reflect the laser beam to outside of the lidar and receive an echo of the laser beam emitted by the laser emitter and reflected by the target object; and a receiving lens, configured to converge the echo of the laser beam emitted by the laser emitter and reflected by the target object onto the detector array, where the detector array is located on a focal plane of the receiving lens.

According to an aspect of the present disclosure, the location $(x_t, y_t)$ on the detector array for the light spot of the echo of the detection beam reflected by the target object is determined by the control unit according to the following formulas:

$$x_t = f*\tan\{2\theta_x(t)\}+x_0$$

$$y_t = f*\tan\{2\theta_y(t)\}+y_0$$

where $(x_0, y_0)$ is a light spot origin location, the light spot origin location is an intersection of an optical axis of the receiving lens on the detector array, f is a focal length of the receiving lens, t is a time of flight calculated starting from a moment when the laser emitter emits a pulse, and $(\theta_2(t), \theta_y(t))$ is an angle component by which the field of view scanning apparatus rotates in an x direction and a y direction within the time t.

According to an aspect of the present disclosure, the control unit of the detection unit is configured to obtain an actual projection location of the echo on the detector array, calculate an offset (Δx, Δy) between a location obtained according to the formula and the actual projection location, calculate an average offset $(\overline{\Delta x}, \overline{\Delta y})$ according to Δx, Δy calculated multiple times, and correct the light spot origin location by using the average offset.

According to an aspect of the present disclosure, the lidar includes a plurality of laser emitters, the detector array includes a plurality of independent sub-planar arrays, and each sub-planar array corresponds to one of the laser emitters and constitutes a detection channel.

According to an aspect of the present disclosure, the laser emitter is an edge-emitting laser or a vertical-cavity surface-emitting laser.

The present disclosure further relates to a detection method of a lidar as described above, including:

emitting a detection beam to outside of the lidar;

calculating a time of flight starting from a moment when the detection beam is emitted;

predicting, according to the time of flight, a location on the detector array for a light spot of the echo of the detection beam reflected by a target object; and reading electric signals of a subset of the photodetectors corresponding to the light spot.

According to an aspect of the present disclosure, the lidar further includes: a laser emitter, configured to emit a laser beam for detecting a target object; an emitting lens, located downstream of an optical path of the laser emitter, and configured to receive the laser beam, modulate the laser beam and emit the modulated laser beam to outside of the lidar; and a receiving lens, configured to converge the echo of the laser beam emitted by the laser emitter and reflected by the target object onto the detector array, where the detector array is located on a focal plane of the receiving lens, where the predicting, according to the time of flight, a location on the detector array for a light spot of the echo of the detection beam reflected by the target object includes: determining a location $(x_t, y_t)$ of the light spot according to the following formulas:

$$x_t = 2\frac{f}{C*t*\cos\theta}h_x + x_0$$

$$y_t = 2\frac{f}{C*t*\cos\theta}h_y + y_0$$

where $(x_0, y_0)$ is a light spot origin location, the light spot origin location is a location on the detector array for a light spot of an echo reflected by the target object from an infinite distance, f is a focal length of the receiving lens, C is a speed of light, t is a time of flight calculated starting from a moment when the laser emitter emits a pulse, θ is an angle between the laser beam emitted by the laser emitter and an optical axis of the receiving lens, and $(h_x, h_y)$ is a distance component between the emitting lens and the receiving lens in an x-axis and a y-axis.

According to an aspect of the present disclosure, the lidar further includes: a laser emitter, configured to emit a laser beam for detecting a target object; a field of view scanning apparatus, configured to reflect the laser beam to outside of the lidar and receive an echo of the laser beam emitted by the laser emitter and reflected by the target object; and a receiving lens, configured to converge the echo of the laser beam emitted by the laser emitter and reflected by the target object onto the detector array, where the detector array is located on a focal plane of the receiving lens, where the predicting, according to the time of flight, a location on the detector array for a light spot of the echo of the detection beam reflected by the target object includes: determining a location $(x_t, y_t)$ of the light spot according to the following formulas:

$$x_t=f*\tan\{2\theta_x(t)\}+x_0$$

$$y_t=f*\tan\{2\theta_y(t)\}+y_0$$

where $(x_0, y_0)$ is a light spot origin location, the light spot origin location is an intersection of an optical axis of the receiving lens on the detector array, f is a focal length of the receiving lens, t is a time of flight calculated starting from a moment when the laser emitter emits a pulse, and $(\theta_x(t), \theta_y(t))$ is an angle component by which the field of view scanning apparatus rotates in an x direction and a y direction within the time t.

According to an aspect of the present disclosure, the detection method further includes:

- obtaining an actual projection location of the echo of the lidar on the detector array;
- calculating an offset $(\Delta x, \Delta y)$ between a location obtained according to the formula and the actual projection location;
- calculating an average offset $(\overline{\Delta x}, \overline{\Delta y})$ according to $\Delta x$, $\Delta y$ calculated multiple times; and
- correcting the light spot origin location by using the average offset.

According to an aspect of the present disclosure, the lidar includes a plurality of laser emitters, the detector array includes a plurality of independent sub-planar arrays, and each sub-planar array corresponds to one of the laser emitters, where an electric signal of a photodetector in a sub-planar array corresponding to the laser emitter is read when one of the laser emitters emits a laser beam.

The present disclosure further relates to a detection method of a lidar as described above, including:

- emitting a detection beam to outside of the lidar;
- calculating a time of flight starting from a moment when the detection beam is emitted;
- predicting, according to the time of flight, a location on the detector array for a light spot of the echo of the detection beam reflected by the target object; and
- controlling a subset of the photodetectors only corresponding to the light spot to be in an activated state and reading electric signals.

According to an aspect of the present disclosure, the lidar further includes: a laser emitter, configured to emit a laser beam for detecting a target object; an emitting lens, located downstream of an optical path of the laser emitter, and configured to receive the laser beam, modulate the laser beam and emit the modulated laser beam to outside of the lidar; and a receiving lens, configured to converge the echo of the laser beam emitted by the laser emitter and reflected by the target object onto the detector array, where the detector array is located on a focal plane of the receiving lens, where the predicting, according to the time of flight, a location on the detector array for a light spot of the echo of the detection beam reflected by the target object includes: determining a location $(x_t, y_t)$ of the light spot according to the following formulas:

$$x_t = 2\frac{f}{C*t*\cos\theta}h_x + x_0$$

$$y_t = 2\frac{f}{C*t*\cos\theta}h_y + y_0$$

where $(x_0, y_0)$ is a light spot origin location, the light spot origin location is a location on the detector array for a light spot of an echo reflected by the target object from an infinite distance, f is a focal length of the receiving lens, C is a speed of light, t is a time of flight calculated starting from a moment when the laser emitter emits a pulse, θ is an angle between the laser beam emitted by the laser emitter and an optical axis of the receiving lens, and $(h_x, h_y)$ is a distance component between the emitting lens and the receiving lens in an x-axis and a y-axis.

According to an aspect of the present disclosure, the lidar further includes: a laser emitter, configured to emit a laser beam for detecting a target object; a field of view scanning apparatus, configured to reflect the laser beam to outside of the lidar and receive an echo of the laser beam emitted by the laser emitter and reflected by the target object; and a receiving lens, configured to converge the echo of the laser beam emitted by the laser emitter ad reflected by the target object onto the detector array, where the detector array is located on a focal plane of the receiving lens, where the predicting, according to the time of flight, a location on the detector array for a light spot of the echo of the detection beam reflected by the target object includes: determining a location $(x_t, y_t)$ of the light spot according to the following formulas:

$$h_t=f*\tan\{2\theta_x(t)\}+x_0$$

$$y_t=f*\tan\{2\theta_y(t)\}+y_0$$

where $(x_0, y_0)$ is a light spot origin location, the light spot origin location is an intersection of an optical axis of the receiving lens on the detector array, f is a focal length of the receiving lens, t is a time of flight calculated starting from a moment when the laser emitter emits a pulse, and $(\theta_x(t), \theta_y(t))$ is an angle component by which the field of view scanning apparatus rotates in an x direction and a y direction within the time t.

According to an aspect of the present disclosure, the detection method further includes:

- obtaining an actual projection location of the echo of the lidar on the detector array;
- calculating an offset $(\Delta x, \Delta y)$ between a location obtained according to the formula and the actual projection location;
- calculating an average offset $(\overline{\Delta x}, \overline{\Delta y})$ according to $\Delta x$, $\Delta y$ calculated multiple times; and
- correcting the light spot origin location by using the average offset.

According to an aspect of the present disclosure, the lidar includes a plurality of laser emitters, the detector array includes a plurality of independent sub-planar arrays, and each sub-planar array corresponds to one of the laser emitters, where an electric signal of a photodetector in a sub-planar array corresponding to the laser emitter is read when one of the laser emitters emits a laser beam.

An exemplary embodiment of the present disclosure provides a detection unit of a lidar. The detection unit can predict a location on a detector array for a light spot of a reflected echo according to a time of flight of a detection beam, and read electric signals of a subset of the photodetectors corresponding to the light spot. An exemplary embodiment of the present disclosure further provides a detection method in which a location on a detector array for a light spot of a reflected echo may be predicted according to a time of flight of a detection beam, and a photosensitive region is dynamically adjusted according to the location of the light spot. On the premise of not enlarging the receiving field of view, the present disclosure realizes all the detection of the received light, suppresses the interference of ambient light, and effectively solves the problem of location shift of the light spot on a focal plane caused by the optical path deformation resulting from mechanical deformation in an optical and mechanical structure.

BRIEF DESCRIPTION OF THE DRAWINGS

The accompanying drawings are used to provide a further understanding of this application, and constitute a part of the specification, are used to explain this application in combination with the embodiments of this application, and do not constitute a limitation to this application. In the accompanying drawings.

DETAILED DESCRIPTION

Figure 1:
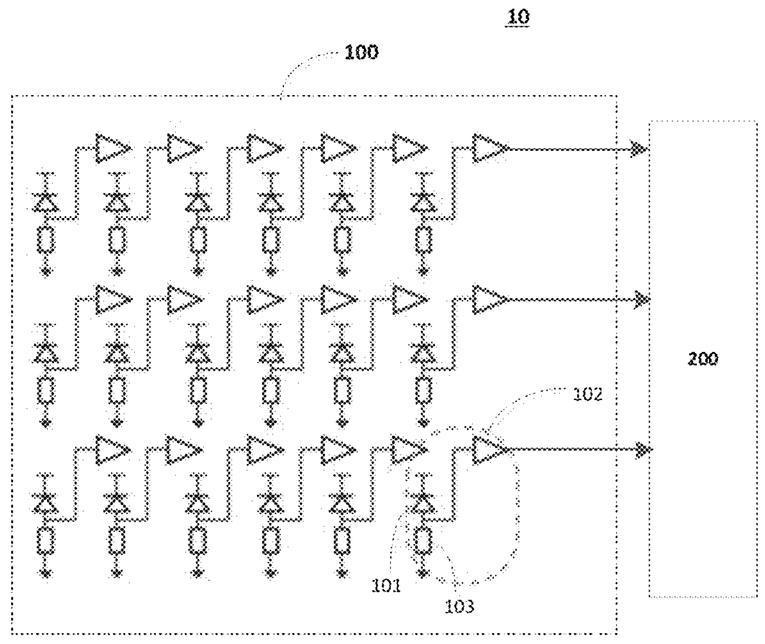
FIG. 1 shows a structural diagram of a planar array of a single-photon avalanche diode according to an exemplary embodiment of the present disclosure.

Exemplary embodiments are briefly described below. As those skilled in the art can realize, the described embodiments may be modified in various different ways without departing from the spirit or the scope of the present disclosure. Therefore, the accompanying drawings and the description are to be considered as essentially illustrative but not restrictive.

In the description of the present disclosure, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure. In addition, the terms "first" and "second" are used for descriptive purposes only and are not to be construed as indicating or implying relative importance or implicitly indicating the number of technical features indicated. Therefore, features defined by "first" and "second" may explicitly or implicitly include one or more of the features. In the descriptions of the present disclosure, unless otherwise explicitly specified, "multiple" means two or more than two.

In the description of the present disclosure, it is to be noted that, unless otherwise expressly specified or defined, terms such as "mount", "connect", and "connection" should be understood in a broad sense, for example, the connection may be a fixed connection, a detachable connection, or an integral connection; or the connection may be a mechanical connection, or may be an electrical connection or in communication with each other; or the connection may be a direct connection, an indirect connection through an intermediate medium, internal communication between two elements, or an interaction relationship between two elements. A person of ordinary skill in the art may understand specific meanings of the foregoing terms in the present disclosure according to specific situations.

In the present disclosure, unless otherwise explicitly stipulated and restricted, that a first feature is "on" or "under" a second feature may include that the first and second features are in direct contact, or may include that the first and second features are not in direct contact but in contact by using other features therebetween. In addition, that the first feature is "on", "above", or "over" the second feature includes that the first feature is right above and diagonally above of the second feature or merely indicates that a level of the first feature is higher than that of the second feature. The first feature being "under", "below", and "underneath" the second feature includes that the first feature is directly below and diagonally below the second feature, or merely indicates that a level of the first feature is lower than that of the second feature.

Many different embodiments or examples are provided in the following disclosure to implement different structures of the present disclosure. In order to simplify the disclosure of the present disclosure, components and settings in examples are described below. Certainly, they are merely examples and are not intended to limit the present disclosure. In addition, in the present disclosure, reference numerals and/or reference letters may be repeated in different examples. The repetition is for the purposes of simplification and clarity, but does not indicate a relationship between the various embodiments and/or settings discussed. In addition, the present disclosure provides examples of various processes and materials, but those of ordinary skill in the art may be aware of application of other processes and/or use of other materials.

Embodiments of the present disclosure are described below in detail with reference to the accompanying drawings. It should be understood that the y embodiments described herein are merely used to illustrate and explain the present disclosure, but are not intended to limit the present disclosure.

FIG. 1 shows a schematic diagram of a detection unit 10 of a lidar according to an embodiment of the present disclosure. A detailed description will be given below with reference to the accompanying drawings. As shown in FIG. 1, the detection unit 10 includes a detector array 100 and a control unit 200. The detector array 100 includes a plurality of micro units, and one micro unit is circled by a dashed line part in FIG. 1. Each micro unit includes a photodetector 101 configured to convert an echo of a detection beam emitted from the lidar and reflected by a target object into an electric signal. The photodetector is, for example, a single-photon avalanche diode (SPAD) with single photon detection capability. The description is made below by using the SPAD as an example. A reverse current of the SPAD is extremely weak when there is no illumination. The reverse current increases rapidly in an avalanche pattern when at least one photon is incident on the SPAD. An avalanche current generated on the SPAD needs to be quenched in time to prepare for detection of a next photon. A passive quenching mode of the SPAD is shown in FIG. 1, the SPAD needs to operate together with a quenching resistor 103. When the SPAD generates a current due to illumination, the current generates a partial voltage across the quenching resistor 103, to reduce a bias voltage of the diode below a reverse breakdown voltage value, to avoid further avalanches. An address line 102 is connected with each SPAD, so that the addressing of individual SPADs can be achieved. The control unit 200 of the lidar is connected to a plurality of SPAD101 through a plurality of address lines 102, and can selectively read electric signals of a subset of SPAD101. For simplicity, FIG. 1 only schematically shows a connection between the control unit 200 and three address lines 102.

Figure 2:
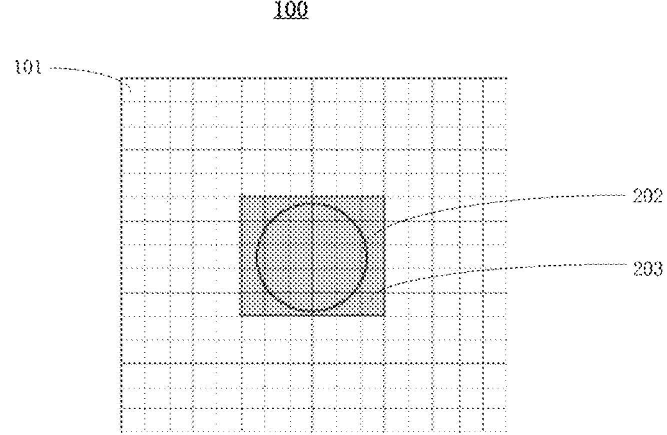
FIG. 2 schematically shows a location on a detector array for a light spot and a photosensitive region determined according to the location for the light spot according to an exemplary embodiment of the present disclosure.

As shown in FIG. 2, the echo of the detection beam emitted from the lidar and reflected by the target object forms a light spot 202 on the detector array 100. A shaded region 203 shown in FIG. 2 covers the light spot 202. Therefore, the control unit of the lidar may only read electric signals of a subset of SPAD101 corresponding to the shaded region 203, thereby accurately detecting the echo of the lidar without reading electric signals outputted by the entire detector array 100, which is equivalent to reducing an effective photosensitive area of the detection unit, thereby effectively suppressing the impact of ambient light, reducing dark current/dark count, and improving capability of the system to detect small signals. The size of the shaded region 203 is basically consistent with that of the light spot 202, which improves the capability of the system to suppress ambient light.

Figure 3:
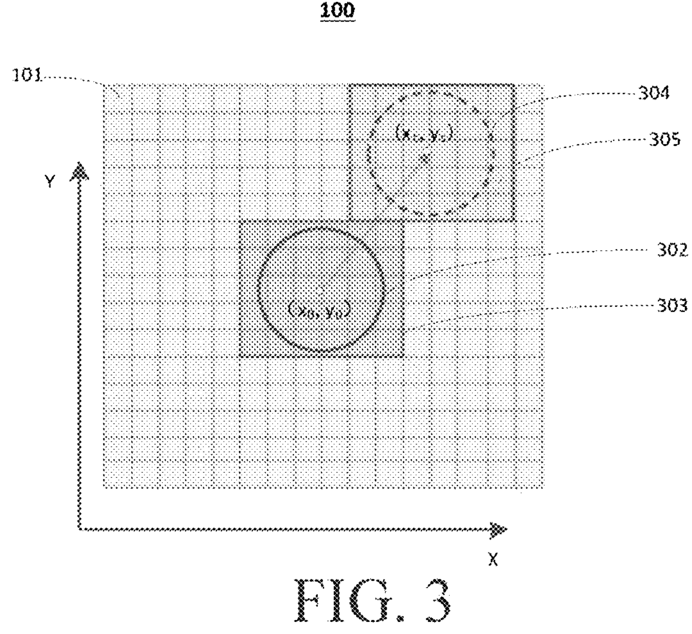
FIG. 3 schematically shows a detection unit of a lidar that is capable of dynamically adjusting a photosensitive region according to an exemplary embodiment of the present disclosure.

FIG. 3 shows a schematic diagram of dynamically adjusting a photosensitive region according to a time of flight.

As shown in FIG. 1, the control unit 200 is coupled to the detector array 100. According to an embodiment of the present disclosure, the control unit 200 is configured to predict a location on the detector array 100 for a light spot of the echo of the detection beam reflected by the target object according to a time of flight t of the detection beam emitted by the lidar, thereby only reading an output electric signal of a subset of photodetector corresponding to the predicted location for the light spot. Details are described below with reference to FIG. 3. A solid line circle shown in FIG. 3 schematically shows a received light spot 302 at an initially-preset location, that is, a location where a laser reflected from an infinite distance is focused on the detector array. A dark color region shows an initially preset photosensitive surface 303, and the photosensitive surface 303 may cover the location of the initial light spot 302. The location for the light spot shifts after the time of flight t has passed, and the shift may be obtained through calculation below. A dashed line circle schematically shows a shifted received light spot 304 obtained through prediction. A light color region shows an adjusted photosensitive surface 305, and the photosensitive surface 305 may cover the received light spot 304.

According to an embodiment of the present disclosure, the plurality of photodetectors 101 all remain in an activated state during operation of the lidar. By updating addresses of a subset of the photodetectors 101 to be read in the detection unit, that is, by reading electric signals of the subset of the photodetectors 101 corresponding to the adjusted photosensitive surface 305, the location of an effective photosensitive surface may be dynamically adjusted. Therefore, it is ensured that all optical signals can be effectively received, and there is no need to read electric signals of the photodetector 101 other than the effective photosensitive surface, which improves the capability of the system to suppress ambient light.

Figure 4:
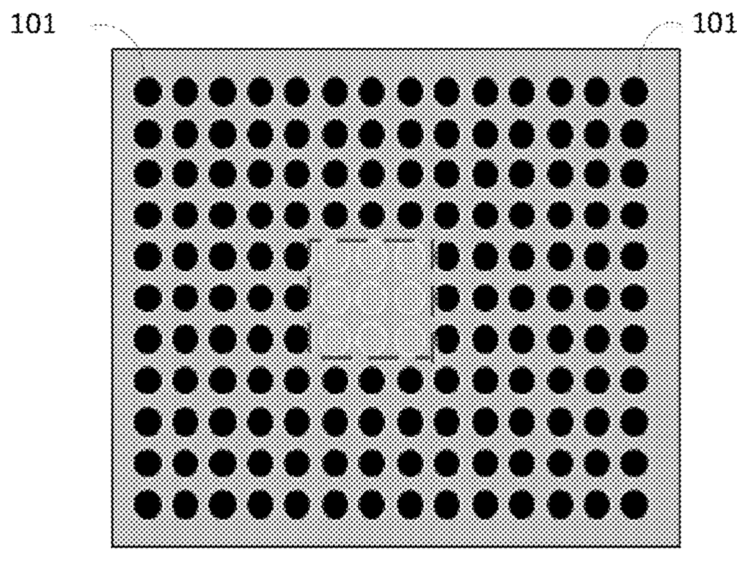
FIG. 4 shows a detector array of a lidar according to an exemplary embodiment of the present disclosure.

FIG. 4 shows a detector array 100' of a lidar according to another embodiment of the present disclosure. The detector array 100' may be used for replacing the detector array 100 shown in FIG. 1 to FIG. 3, and differences between the detector array 100' and the detector array 100 are mainly described in detail below with reference to the accompanying drawings. In addition, unless otherwise stated, features of the detector array 100 in FIG. 1 to FIG. 3 may be used for a detector array 100' shown in FIG. 4. As shown in FIG. 4, the detector array 100' includes a plurality of photodetectors 101, and the photodetectors 101 are arranged in an array and are individually addressable, which is the same as the embodiments shown in FIG. 1 to FIG. 3. All the photodetectors 101 shown in FIG. 1 to FIG. 3 always remain in an activated state (a bias voltage of the micro unit is higher than the reverse breakdown voltage), and the control unit only reads electric signals of a subset of SPAD101. In an embodiment, as shown in FIG. 4, the control unit 200 (as shown in FIG. 1) is coupled to the detector array 100', and is configured to predict a location on the detector array for a light spot of the echo of the detection beam reflected by the target object according to a time of flight of the detection beam emitted by the lidar, and a difference from the embodiments shown in FIG. 1 to FIG. 3 is that, the control unit 200 in the embodiment shown in FIG. 4 energizes only a subset of the photodetectors 101 corresponding to the light spot in the detector array 100 to be in an activated state, and reads electric signals of the subset of the photodetectors. And other photodetectors 101 are in a deactivated state (the bias voltage of the micro unit is lower than the reverse breakdown voltage), the close state means that the photodetector is unresponsive regardless of whether there is photon illumination. In FIG. 4, photodetectors located in the middle of the photodetector array, for example, photodetectors identified by a dashed line box are displayed as a different color from surrounding photodetectors, which indicates that the photodetectors in the middle with a different color are in an activated state and can detect the echo of the lidar. However, the surrounding photodetectors are in a deactivated state and cannot detect the echo of the lidar.

In view of this, according to an exemplary embodiment of the present disclosure, in addition to a plurality of address lines configured to be connected to the photodetectors for reading electric signals, the control unit 200 further includes a plurality of energizing lines respectively coupled to the photodetectors 101 and configured to control on or off of the photodetectors 101 (the quenching mode is not shown in the figure for simplicity), and details are described in detail below.

Figure 5:
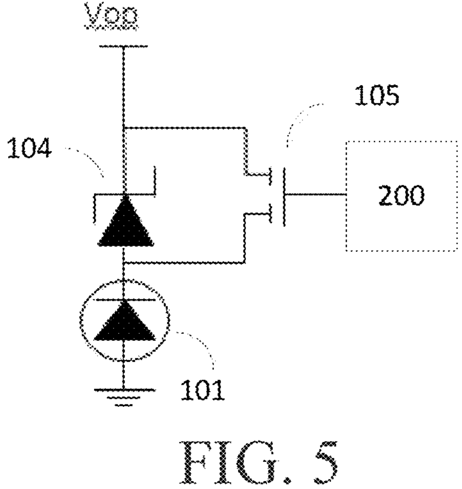
FIG. 5 shows a drive circuit for each photodetector according to an exemplary embodiment of the present disclosure.

FIG. 5 shows a drive circuit for each photodetector 101 according to an embodiment of the present disclosure. As shown in FIG. 5, the drive circuit includes a Zener diode 104 and a switching device 105. The photodetector 101 is connected to a drive voltage through the Zener diode 104. The switching device 105 is coupled at two ends of the Zener diode 104, and on or off of the switching device 105 is controlled by the control unit 200, for example, the control unit 200 may be coupled to a control terminal of the switching device 105 to control the on or off of the switching device 105 and control whether the Zener diode is short-circuited or not. For example, when the switching device 105 is turned on, the Zener diode 104 is short-circuited, the photodetector 101 is directly coupled to a drive voltage $V_{op}$, and the photodetector 101 is activated. When the switching device 105 is turned off, the Zener diode 104 is not short-circuited, the voltage at two ends of the photodetector is obtained by subtracting $V_{zener}$ from $V_{op}$ (where $V_{zener}$ is a Zener voltage of the Zener diode), which is lower than a reverse breakdown voltage $V_{BR}$ of the photodetector 101, and therefore, the photodetector 101 is disabled. According to an embodiment of the present disclosure, a Zener voltage of the Zener diode $V_{zener} \geq V_{ov}$ (where $V_{ov}$ is an over-bias voltage of the photodetector 101), drive voltage $V_{op}=V_{ov}+V_{BR}$, where $V_{op}-V_{zene\ r} \leq V_{BR}$ is met. Since the foregoing devices are all semiconductor devices, the devices can be constructed as an integrated circuit in principle. In this way, the devices are integrated on each photodetector, so that the photodetector is activated to be quickly turned on and off.

According to an embodiment of the present disclosure, the switching device may include a field-effect transistor FET, where a gate of the switching device is used as a control terminal connected to the control unit 200 through the energizing line; and a source and drain of the switching device are respectively connected to two ends of the Zener diode. Alternatively, the switching device may also include a bipolar junction transistor (BJT). According to an embodiment of the present disclosure, the photodetector is a single-photon detector.

Figure 6:
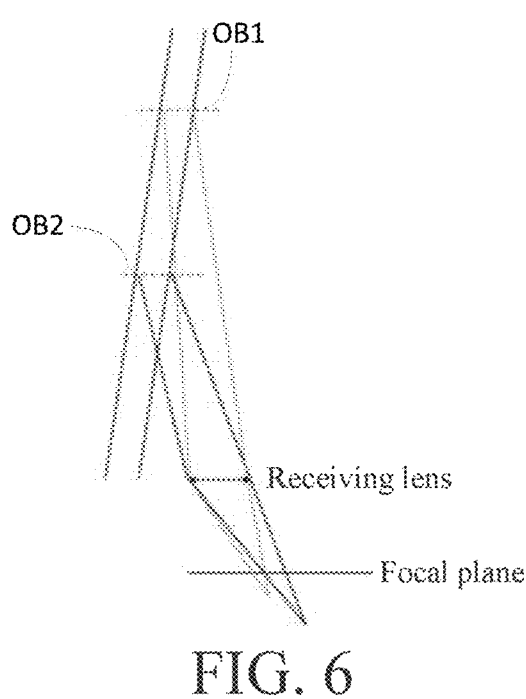
FIG. 6 shows a schematic diagram of the sizes of light spots generated on a detector array of a lidar by two target objects at different distances from the lidar according to an exemplary embodiment of the present disclosure.

The inventor found that, the size of the light spot may change to a certain extent with the change of distance, and the size of the received light spot is related to the size of an emitting light spot, the size of a receiving lens, the focal length, and the distance. To be specific, a closer target object indicates a larger light spot. The size of the light spot does not greatly change when the target object is far away from the lidar. Generally, the size of the light spot may obviously change when the distance between the target object and the lidar is within several meters, and an exemplary value may be obtained according to optical simulation. Therefore, according to an embodiment of the present disclosure, during the prediction of the received light spot 304 based on the calculation of the time of flight, in addition to calculating the location for a center of the received light spot 304, the size of the received light spot 304 may also be calculated. For example, a longer time of flight indicates a smaller received light spot 304. On the contrary, a shorter time of flight indicates a larger received light spot 304. Therefore, the area of the photosensitive surface 305 can be appropriately adjusted. The detailed description is made below with reference to FIG. 6. FIG. 6 shows two target objects at different distances from the lidar, that is, a first target object OB1 and a second target object OB2, where the first target object OB1 is farther from the lidar. Generally, after being focused by the receiving lens, a focusing location of a reflected echo of a target object farther from the lidar is closer to a focal plane of the lidar, and the photodetectors are all arranged on the focal plane of the receiving lens. Therefore, the size of the light spot of the echo irradiated on the photodetector array is smaller. Therefore, as shown in FIG. 6, the area of a light spot irradiated on the photodetector array by an echo generated by the first target object OB1 is significantly smaller than the area of a light spot irradiated on the photodetector array by an echo generated by the second target object OB2.

According to an exemplary embodiment of the present disclosure, as shown in FIG. 3, the pre-set area of the photosensitive surface is adjustable, which may be dynamically adjusted according to the distance of the target object. For example, a smaller photosensitive surface is pre-set for a farther target object, that is, electric signals of less photodetectors are read, or less photodetectors are activated and electric signals are read; and a larger photosensitive surface is pre-set for a closer target object, that is, electric signals of more photodetectors are read, or more photodetectors are activated and electric signals are read, and in this case, the area of the photosensitive region is similar to the size of the received light spot. Alternatively, the size of the photosensitive surface pre-set in FIG. 3 may be fixed, for example, the size may be subject to the size of a light spot reflected to the focal plane by a target object at an infinite distance an infinite distance. In this case, the target object at a closer distance has a reflected echo of higher intensity, and reading electric signals of a subset of the photodetectors corresponding to actually irradiated light spot will not affect detection. Alternatively, different sizes of the photosensitive surface are pre-set for target objects at different distances. For example, in a case that the distance between the target object and the lidar is greater than 5 meters, the control unit selects a first photosensitive surface size, for example, the size of the light spot reflected to the focal plane by the target object at an infinite distance; and in a case that the distance between the target object and the lidar is less than 5 meters, the control unit selects a second photosensitive surface size, for example, the size of a light spot reflected to the focal plane by the target object 5 meters away from the lidar.

The present disclosure further relates to a lidar including the detection unit 10 as described above. The detailed description is made below with reference to FIG. 7.

Figure 7:
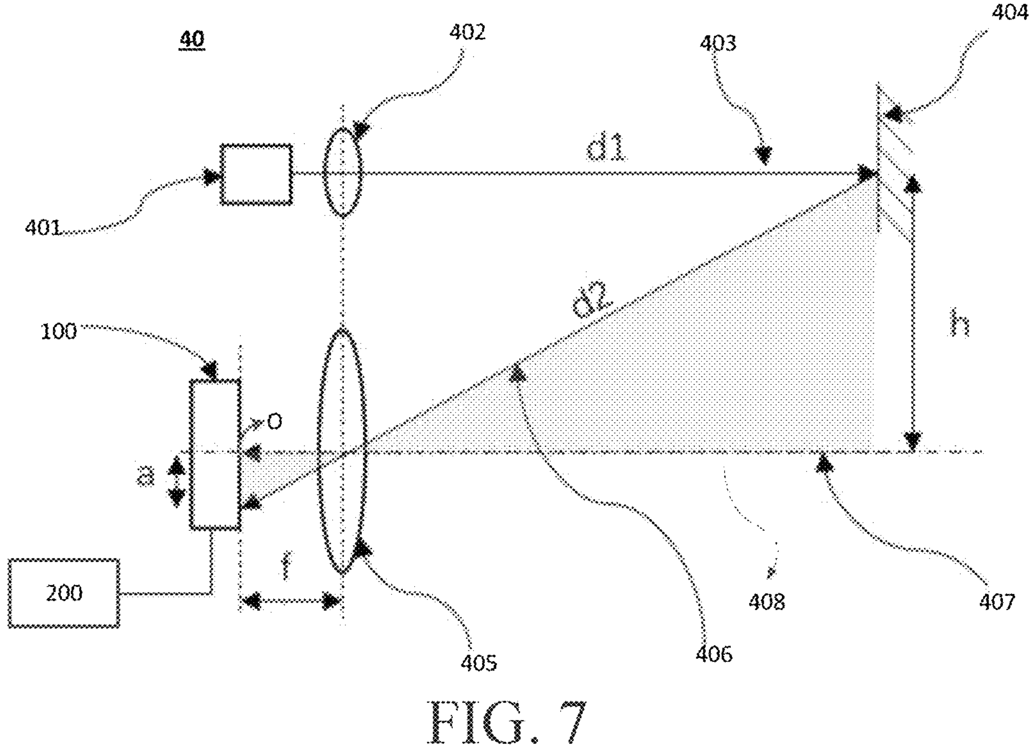
FIG. 7 schematically shows an optical path diagram and light spot shift of a paraxial lidar according to an exemplary embodiment of the present disclosure.

According to an exemplary embodiment of the present disclosure, a lidar 40 shown in FIG. 7 includes a laser emitter 401, an emitting lens 402, a receiving lens 405, and the detection unit 10 as described above (where the detection unit 10 includes the detector array 100 and the control unit 200). The laser emitter 401 may emit a laser beam 403 for detecting a target object; the emitting lens 402 is located downstream of an optical path of the laser emitter 401, and is configured to receive the laser beam 403, collimate and then emit the laser beam 403 to outside of the lidar for detection of the target object 404; and the receiving lens 405 is configured to receive an echo 406 of the laser beam 403 from the laser emitter reflected by the target object 404 and converge the echo onto the detector array 100, where the detector array 100 is located on a focal plane of the receiving lens 405.

FIG. 7 shows a case in which a paraxial optical path is adopted and the emitted laser beam 403 is parallel to an optical axis 407 of the receiving lens 405. At different reflection distances, an offset of a light spot imaged by the laser beam on the focal plane from a received light spot origin o is a, where a is a function of the time of flight t. The focal length of the receiving lens 405 is f, and in a case that the emitted laser beam 403 is parallel to the optical axis 407 of the receiving lens, a distance between the emitted laser beam 403 and an axial center of the receiving lens 405 is h (that is, a paraxial optical axis distance is h), and a flight distance d≈C*t/2. Assuming that the distance between the emitting lens 402 and the target object 404 is d, the distance between the target object 404 and the receiving lens 405 is d2, the following relation is established:

$$a(t) = \frac{f}{d1}h \approx 2\frac{f}{C*t}h$$

(since h<<d1, it can be considered that d1≈d2, and d1≈C*t/2, where C is a speed of light).

To simplify the description process, the location for the light spot is represented by a coordinate of a center of the light spot (that is, a center coordinate of a circular light spot shown in FIG. 3), and an X-Y coordinate system for describing the location for the light spot is shown in FIG. 3. A coordinate at which a laser 408 reflected from an infinite distance is focused on the focal plane are defined as a received light spot origin o ($x_0$, $y_0$) of a channel, which is shown in FIG. 3. In a case that the emitted laser beam 403 is parallel to the optical axis 407 of the receiving lens, the location ($x_t$, $y_t$) on the focal plane for the light spot and the time of flight shall satisfy the following formulas:

$$x_t = 2\frac{f}{C*t}h_x + x_0$$

$$y_t = 2\frac{f}{C*t}h_y + y_0$$

In the foregoing formulas, the focal length f of the receiving lens, the speed of light C, $h_x$, and $h_y$ (where $h_x$, and $h_y$ are components of the paraxial optical axis distance h in an x-axis and a y-axis) are all constants, t is a time of flight calculated a moment when a laser emitter emits a pulse. In view of this, the light spot moves towards the origin o ($x_0$, $y_0$) with the increase of the time of flight t.

It can be seen from a relationship between the coordinates of the light spot and the time of flight, a theoretical location for the light spot may be calculated in real time according to the time the laser has already flown, and selections pre-set for the area of the photosensitive region (the area of the photosensitive surface) are referred, so that a reading address of the detector array is planned in real time, and the location of the photosensitive region can be dynamically and quickly adjusted by the detection unit formed by the detector array, thereby detecting received light and suppressing ambient light interference.

In another embodiment of the present disclosure, a theoretical location of the light spot may be calculated in real time according to the time period the laser has already flown, and selections pre-set for the area of the photosensitive region (the area of the photosensitive surface) are referred, so that a subset of photodetectors are planned in real time to be in an activated state and electric signals are read, and the location of the photosensitive region can be dynamically and quickly adjusted by the detection unit formed by the detector array, thereby detecting received light and suppressing ambient light interference.

Figure 8:
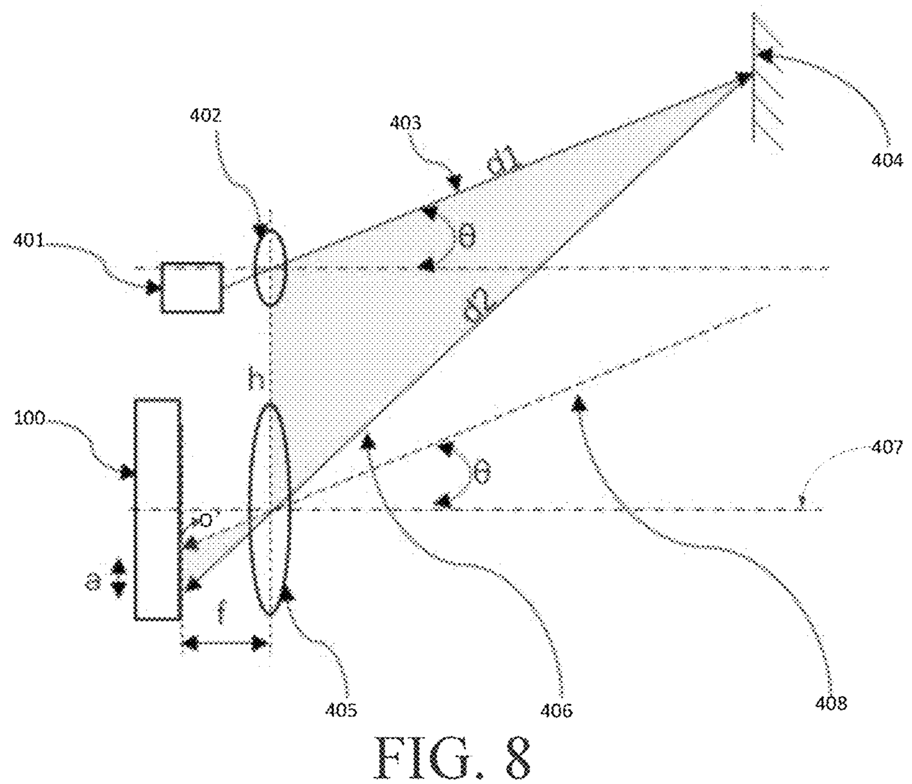
FIG. 8 schematically shows an optical path diagram and light spot shift of a paraxial lidar according to an exemplary embodiment of the present disclosure.

FIG. 7 shows a case in which the emitted laser beam 403 is parallel to an optical axis 407 of the receiving lens 405, and FIG. 8 shows a more general case. As shown in FIG. 8, for a lidar with a paraxial optical path, an angle θ is usually formed between the emitted laser beam 403 and the optical axis 407 of the receiving lens 405, and the calculation of the location of the incident light spot in a general case is described below with reference to FIG. 8. In FIG. 8, o' is a convergence location at the angle θ of the reflected echo in the focal plane of the receiving lens 405 when the target object is at an infinite distance, a is an offset of an actual convergence location of the light spot relative to o', which is also a function of the time of flight t.

It can be seen from a geometrical relationship that, triangles of two shaded regions in FIG. 8 are similar, and the following relation is established:

$$\frac{h}{d1} = \frac{a}{f/\cos\theta};$$

which is transformed to be:

$$a(t) = \frac{h*f}{d1*\cos\theta}.$$

Since h<<d1, it can be considered that d1≈d2≈C*t/2, substituted into the foregoing formula to obtain:

$$a(t) = 2\frac{h*f}{C*t*\cos\theta}$$

It is more general that the emitted laser beam 403 is not parallel to the optical axis 407 of the receiving lens, parallelism is only a special case of such a model, that is, θ=0. In the same way, the location on the focal plane ($x_t$, $y_t$) for the light spot and the time of flight shall satisfy the following formulas:

$$x_t = 2\frac{f}{C*t*\cos\theta}h_x + x_0$$

$$y_t = 2\frac{f}{C*t*\cos\theta}h_y + y_0$$

where, $h_x$ and $h_y$ are components of the paraxial optical axis distance h in the x-axis and the y-axis. Locations of the light spot at various angles can be predicted by using the foregoing formulas, so that the photosensitive surface can be adjusted on real time according to the change of the location of the received light spot.

Figure 9:
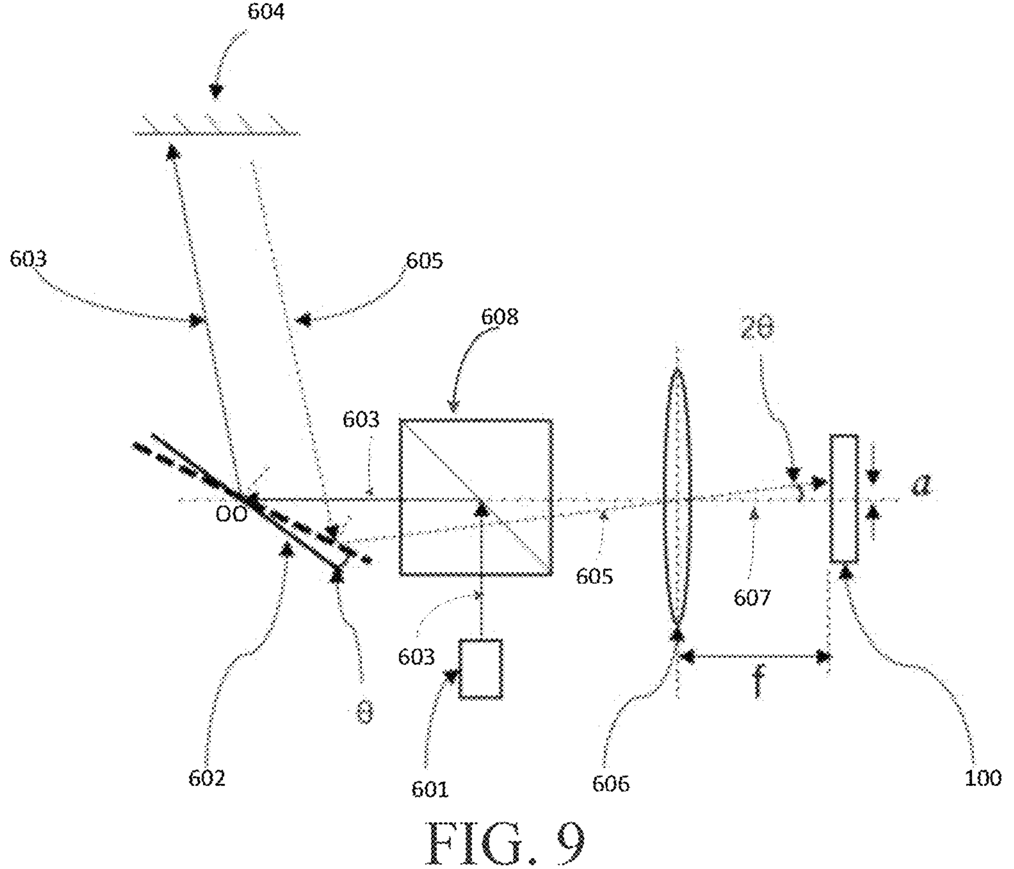
FIG. 9 schematically shows an optical path diagram and light spot shift of a scanning galvanometer lidar according to an exemplary embodiment of the present disclosure.

FIG. 7 and FIG. 8 show calculation and prediction of the location of the light spot in a lidar with a paraxial optical path. FIG. 9 shows an embodiment of a lidar with a coaxial optical path.

According to another exemplary embodiment of the present disclosure, the lidar shown in FIG. 9 includes: a laser emitter 601, a field of view scanning apparatus 602, and a receiving lens 606. The laser emitter 601 is configured to emit a laser beam 603 for detecting a target object, and the laser beam 603 is incident on a beam splitter 608 (or referred to as a coupler). The beam splitter 608 is, for example, a semi-transparent and semi-reflective film, which reflects a subset of laser beams 603 onto the field of view scanning apparatus 602. The field of view scanning apparatus 602 is rotatable about rotation axis oo thereof. For example, the field of view scanning apparatus 602 rotates within a paper surface of FIG. 9, thereby reflecting the laser beam 603 incident thereon to the outside of the lidar in different directions, to detect the target object 604. The laser beam 603 diffusely reflects on the target object 604, part of an echo 605 returns to the field of view scanning apparatus 602, the part of the echo 605 is reflected onto the beam splitter 608 by the field of view scanning apparatus 602, the echo transmitted through the beam splitter 608 is converged to the detector array 100 through the receiving lens 606, and the detector array 100 is located on the focal plane of the receiving lens 606.

The field of view scanning apparatus includes a galvanometer or an oscillating mirror. Taking the galvanometer as the field of view scanning device as an example, the optical axis 607 of the receiving lens 606 and the laser beam 603 can be parallel and even overlapped at a moment of laser emission, so that a receiving field of view can be consistent with an emitting field of view.

However, field of view scanning is achieved by rapidly rotating galvanometer, and the galvanometer has rotated by a certain angle θ (t) when the echo generated by the emitted laser beam 603 is received again after the time of flight t, so that an angle between the received echo 605 passing through the receiving lens 606 and the optical axis 607 of the receiving lens is 2θ (t) (which is caused by normal line deflection by θ(t)).

In view of this, the offset of the light spot on the detection unit 100 is:

$$a(t)=f^{*}\tan\{2\theta(t)\}$$

An intersection of the optical axis 607 of the receiving lens on the focal plane is defined as a light spot origin location ($x_0$, $y_0$), and the coordinate ($x_t$, $y_t$) of the light spot on the focal plane and the time of flight satisfy the following formulas:

$$x_t+=f^{*}\tan\{2\theta_x(t)\}+x_0$$

$$y_t=f^{*}\tan\{2\theta(t)\}+y_0$$

In the foregoing formulas, $\theta_x(t)$ and $\theta_y(t)$ are components of θ(t), θ(t) is related to the vibration speed of the galvanometer, and the location of the light spot may be accurately predicted based on the foregoing formula θ(t), thereby adjusting the effective photosensitive surface of the detector array in real time.

In the foregoing descriptions, whether it is a lidar of a paraxial optical path or a lidar based on a scanning field of view, the location of the light spot on the detection unit can be calculated according to the time of flight. During actual operation, mechanical aging and deformation, glue deformation, and thermal expansion and cold contraction, and other reasons may lead to a deviation of light spot origin location ($x_0$, $y_0$), which will lead to inconsistency between the theoretically calculated light spot location ($x_t$, $y_t$) and the actual light spot coordinate (x', y') on the detection unit. In this case, correction is preferably required.

To solve the deviation of the light spot origin caused by mechanical deformation, after each detection of the actual spot location, the offset calculation can be performed to obtain the difference between the theoretically calculated spot location ($x_t$, $y_t$) and the coordinate (x', y') of the actual light spot on the detection unit. The formula is as follows:

$$\Delta x=x'-x_t$$

$$\Delta y=y'-y_t$$

Since the process of mechanical deformation process is relatively slow, in order to measure the offset more accurately and increase the robustness of the system, the offset can be measured for a long time to give more accurate results ($\overline{\Delta x}$, $\overline{\Delta y}$) in the statistical sense. For example, offset obtained by calculating for 1000 times are averaged.

After an accurate offset of the light spot origin location (( $\overline{\Delta x}$, $\overline{\Delta y}$)) is obtained, the original coordinate ($x_0$, $y_0$) of the light spot origin location is replaced with corrected new coordinate ($\overline{\Delta x}+x_0$, $\overline{\Delta y}+y_0$) of the light spot for subsequent more accurate calculation of the location of the light spot based on the time of flight.

According to an exemplary embodiment of the present disclosure, a laser emitter of an emitting end may include a plurality of edge-emitting lasers or vertical-cavity surface-emitting lasers. The detector array may include a plurality of independent sub-planar array located on the focal plane of the receiving lens, and each sub-planar array corresponds to one of the laser emitters and constitutes a detection channel. Alternatively, a large photodetector array is arranged on the focal plane of the receiving lens, and different regions correspond to different laser emitters to constitute a detection channel.

Figure 10:
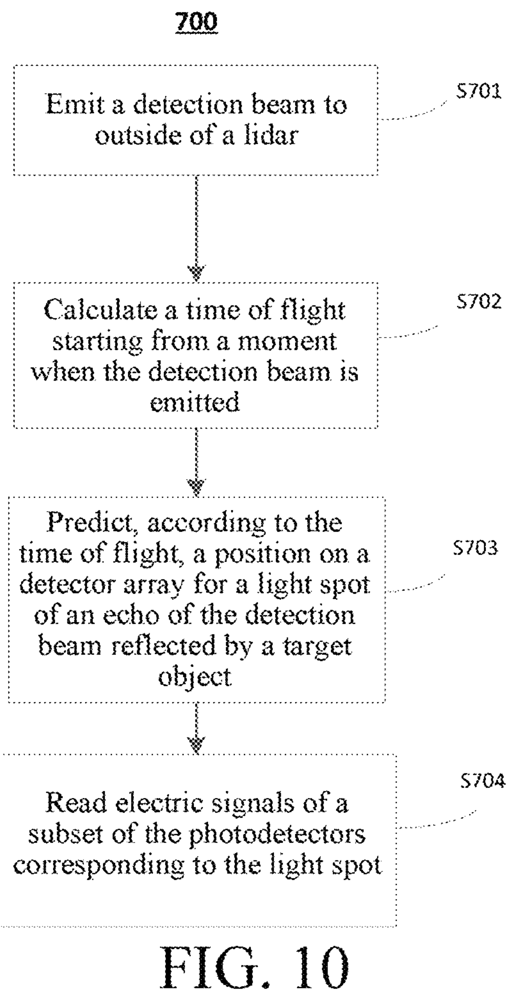
FIG. 10 shows a detection method of a lidar of predicting a location for a light spot according to a time of flight according to an exemplary embodiment of the present disclosure.

The present disclosure further relates to a method 700 that performs laser detection by using a lidar 40 provided in the present disclosure. As shown in FIG. 10, steps are as follows:

At step S701: Emit a detection beam to outside of a lidar.

At step S702: Calculate a time of flight starting from a moment when the detection beam is emitted.

At step S703: Predict, according to the time of flight, a location on a detector array for a light spot of an echo of the detection beam reflected by a target object.

At step S704: Read electric signals of a subset of the photodetectors corresponding to the light spot.

At step S703, the method for predicting the location of the light spot according to the time of flight is determined according to the structure of the lidar. For paraxial lidar and the scanning galvanometer lidar, the formula for calculating the location of the light spot is provided in the foregoing embodiments, and details will not be repeated herein. For offset of the light spot origin caused by mechanical aging and deformation, glue deformation, and thermal expansion and cold contraction, the correction method has also been described above, and details will not be repeated herein.

The method shown in FIG. 10 is also applicable to a multi-channel lidar. The lidar includes a plurality of laser emitters, the detector array includes a plurality of independent sub-planar arrays, and each sub-planar array corresponds to one of the laser emitters, where an electric signal of a photodetector in a sub-planar array corresponding to the laser emitter is read when one of the laser emitters emits a laser beam.

Figure 11:
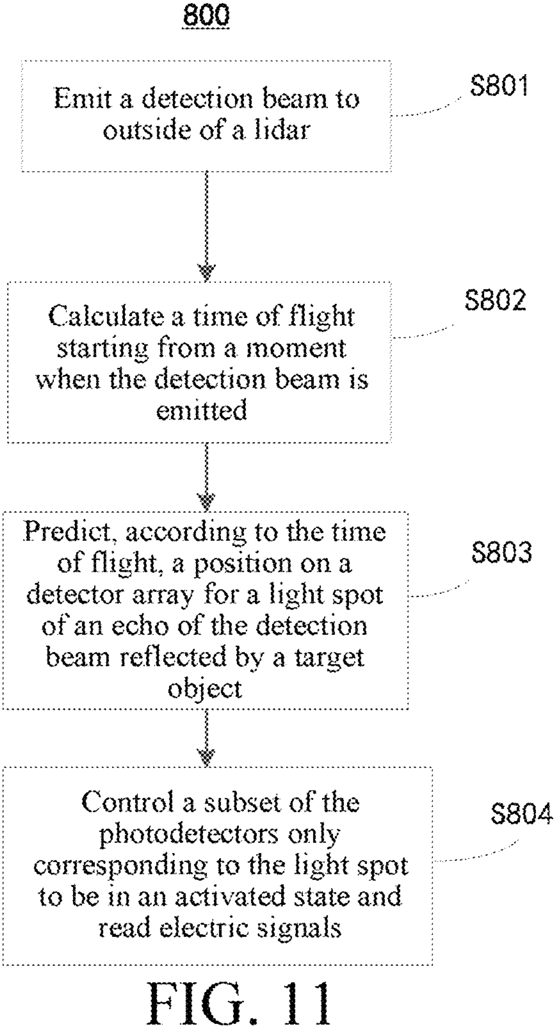
FIG. 11 shows a detection method of a lidar of predicting a location for a light spot according to a time of flight according to an exemplary embodiment of the present disclosure.

The present disclosure further relates to a method 800 that performs laser detection by using a lidar 40 provided in the present disclosure. As shown in FIG. 11, steps are as follows:

At step S801: Emit a detection beam to outside of a lidar.

At step S802: Calculate a time of flight starting from a moment when the detection beam is emitted.

At step S803: Predict, according to the time of flight, a location on a detector array for a light spot of an echo of the detection beam reflected by a target object.

At step S804: Control a subset of the photodetectors only corresponding to the light spot to be in an activated state and read electric signals.

At step S803, the method for predicting the location of the light spot according to the time of flight is determined by the structure of the lidar. For paraxial lidar and the scanning galvanometer lidar, the formula for calculating the location of the light spot has been provided in the foregoing embodiments, and details will not be repeated herein. For offset of the light spot origin caused by mechanical aging and deformation, glue deformation, and thermal expansion and cold contraction, the correction method has also been described above, and details will not be repeated herein.

At step S804, the method of controlling only a subset of the photodetectors corresponding to the light spot to be in an activated state has been provided in the foregoing embodiments, and details will not be repeated herein.

An exemplary embodiment of the present disclosure provides a detection unit of a lidar that can dynamically adjust a photosensitive region, and provides a method for calculating a location of a light spot according to a time of flight based on different lidar structures. An exemplary embodiment of the present disclosure further provides a detection method of a lidar through dynamic adjustment performed on the photosensitive surface. All received light is detected, without increasing the receiving field of view, ambient light interference is suppressed, and the problem of location offset of the light spot on a focal plane caused by optical path deformation resulting from mechanical deformation in an optical machine structure is effectively solved.

It should be finally noted that the foregoing descriptions are merely exemplary embodiments of the present disclosure, but are not intended to limit the present disclosure. Although the present disclosure has been described in detail with reference to the foregoing embodiments, for a person of ordinary skill in the art, modifications can be made to the technical solutions described in the foregoing embodiments, or equivalent replacements can be made to certain technical features in the technical solutions. Any modification, equivalent replacement, or improvement made and the like within the spirit and principle of the present disclosure shall fall within the protection scope of the present disclosure.

What is claimed is:

1. A detection device of a light detection and ranging (lidar) device, comprising:

a detector array, comprising a plurality of individually addressable photodetectors, wherein each of the plurality of individually addressable photodetectors is configured to:

receive an echo of a detection beam emitted by the lidar device and reflected by a target object; and convert the echo into an electric signal;

a controller, coupled to the detector array, and configured to:

predict a location on the detector array for a light spot of the echo of the detection beam reflected by the target object according to a time of flight of the detection beam emitted by the lidar device;

energize a subset of the plurality of individually addressable photodetectors corresponding to the light spot to be in an activated state; and read electric signals of the subset of the plurality of individually addressable photodetectors; and a drive circuit for each of the plurality of individually addressable photodetectors, wherein the drive circuit comprises a Zener diode, each of the plurality of individually addressable photodetectors is connected to a drive voltage through the Zener diode, wherein the drive circuit further comprises a switching device coupled at two ends of the Zener diode, wherein the switching device is coupled to the controller, and an on or an off state of the switching device is controlled by the controller, wherein based on the switching device being turned on, the Zener diode is short-circuited and the corresponding photodetector is activated, and wherein based on the switching device being turned off, the Zener diode is not short-circuited, and the corresponding photodetector is disabled.

2. The detection device according to claim 1, wherein each of the plurality of individually addressable photodetectors comprises a single-photon detector, the detection device further comprises a plurality of address lines respectively corresponding to and connected to the plurality of individually addressable photodetectors, and the controller is electrically connected to the plurality of individually addressable photodetectors through the plurality of address lines for reading the electric signals.

3. A light detection and ranging (lidar) device, comprising a detection device, the detection device comprising:

a detector array, comprising a plurality of individually addressable photodetectors, wherein each of the plurality of individually addressable photodetectors is configured to:

receive an echo of a detection beam emitted by the lidar device and reflected by a target object; and convert the echo into an electric signal;

a controller, coupled to the detector array, and configured to:

predict a location on the detector array for a light spot of the echo of the detection beam reflected by the target object according to a time of flight of the detection beam emitted by the lidar device; and read electric signals of a subset of the plurality of individually addressable photodetectors corresponding to the light spot;

a laser emitter, configured to emit a laser beam for detecting the target object;

an emitting lens, located downstream of an optical path of the laser emitter, and configured to:

receive the laser beam;

modulate the laser beam; and emit the modulated laser beam to outside of the lidar device; and a receiving lens, configured to:

receive an echo of the laser beam emitted by the laser emitter and reflected by the target object; and converge the echo onto the detector array, wherein the detector array is located on a focal plane of the receiving lens, wherein a location $(x_r, y_r)$ on the detector array for the light spot of the echo of the detection beam reflected by the target object is determined by the controller according to the following formulas:

$$x_t = 2\frac{f}{C*t*\cos\theta}h_x + x_0$$

$$y_t = 2\frac{f}{C*t*\cos\theta}h_y + y_0$$

wherein $(x_0, y_0)$ is a light spot origin location, the light spot origin location is a location on the detector array for a light spot of an echo reflected by the target object from an infinite distance, f is a focal length of the receiving lens, C is a speed of light, t is a time of flight calculated starting from a moment when the laser emitter emits a pulse, θ is an angle between the laser beam emitted by the laser emitter and an optical axis of the receiving lens, and $(h_x, h_y)$ is a distance component between the emitting lens and the receiving lens in an x-axis and a y-axis, and wherein the controller of the detection device is configured to:

obtain an actual projection location of the echo of the lidar device on the detector array;

calculate an offset (Δx, Δy) between a location obtained according to the formulas and the actual projection location;

calculate an average offset $(\overline{\Delta x}, \overline{\Delta y})$ according to Δx, Δy calculated multiple times; and correct the light spot origin location by using the average offset.

4. The lidar device according to claim 3, wherein the lidar device comprises a plurality of laser emitters, the detector array comprises a plurality of independent sub-planar arrays, and each of the plurality of independent sub-planar arrays corresponds to one of the plurality of laser emitters and constitutes a detection channel.

5. The lidar device according to claim 3, wherein the laser emitter is an edge-emitting laser or a vertical-cavity surface-emitting laser.

6. The lidar device according to claim 3, wherein the controller of the detection device is further configured to control the subset of the plurality of individually addressable photodetectors corresponding to the light spot to be in an activated state, before reading the electric signals of the subset of the plurality of individually addressable photodetectors corresponding to the light spot.

7. The lidar device according to claim 3, wherein each of the plurality of individually addressable photodetectors comprises a single-photon detector, the detection device further comprises a plurality of address lines respectively corresponding to and connected to the plurality of individually addressable photodetectors, and the controller is electrically connected to the plurality of individually addressable photodetectors through the plurality of address lines for reading the electric signals.

8. The lidar device according to claim 3, wherein the plurality of individually addressable photodetectors remain in an activated state during an operation of the lidar device.

9. A detection method of a light detection and ranging (lidar) device, wherein a detection device of the lidar device comprises a detector array that comprises a plurality of individually addressable photodetectors, wherein each of the plurality of individually addressable photodetectors is configured to receive an echo of a detection beam emitted by the lidar device and reflected by a target object, and further configured to convert the echo into an electric signal, the detection method comprising:

emitting a detection beam to outside of the lidar device;

calculating a time of flight starting from a moment when the detection beam is emitted;

predicting, according to the time of flight, a location on the detector array for a light spot of the echo of the detection beam reflected by the target object; and reading electric signals of a subset of the plurality of individually addressable photodetectors corresponding to the light spot, wherein the lidar device further comprises:

a laser emitter, configured to emit a laser beam for detecting the target object;

an emitting lens, located downstream of an optical path of the laser emitter, and configured to:

receive the laser beam;

modulate the laser beam; and emit the modulated laser beam to outside of the lidar device; and a receiving lens, configured to:

receive an echo of the laser beam emitted by the laser emitter and reflected by the target object; and converge the echo onto the detector array, wherein the detector array is located on a focal plane of the receiving lens, wherein the predicting, according to the time of flight, the location on the detector array for the light spot of the echo of the detection beam reflected by the target object comprises:

determining a location $(x_t, y_t)$ of the light spot according to the following formulas:

$$x_t = 2\frac{f}{C*t*\cos\theta}h_x + x_0$$

$$y_t = 2\frac{f}{C*t*\cos\theta}h_y + y_0$$

wherein $(x_0, y_0)$ is a light spot origin location, the light spot origin location is a location on the detector array for a light spot of an echo reflected by the target object from an infinite distance, f is a focal length of the receiving lens, C is a speed of light, t is a time of flight calculated starting from a moment when the laser emitter emits a pulse, θ is an angle between the laser beam emitted by the laser emitter and an optical axis of the receiving lens, and $(h_x, h_y)$ is a distance component between the emitting lens and the receiving lens in an x-axis and a y-axis, wherein the method further comprises:

obtaining an actual projection location of the echo of the lidar device on the detector array;

calculating an offset (Δx, Δy) between a location obtained according to the formulas and the actual projection location;

calculating an average offset $(\overline{\Delta x}, \overline{\Delta y})$ according to Δx, Δy calculated multiple times; and correcting the light spot origin location by using the average offset.

10. The detection method according to claim 9, wherein the lidar device comprises a plurality of laser emitters, the detector array comprises a plurality of independent sub-planar arrays, and each of the plurality of independent sub-planar arrays corresponds to one of the plurality of laser emitters, wherein an electric signal of one of the plurality of individually addressable photodetectors in one of the plurality of independent sub-planar arrays read when a corresponding laser emitter emits a laser beam.

11. The detection method according to claim 9, wherein, before reading the electric signals of the subset of the plurality of individually addressable photodetectors corresponding to the light spot, the detection method further comprises:

controlling the subset of the plurality of individually addressable photodetectors corresponding to the light spot to be in an activated state.

12. The detection method according to claim 9, wherein each of the plurality of individually addressable photodetectors comprises a single-photon detector, the detection device further comprises a plurality of address lines respectively corresponding to and connected to the plurality of individually addressable photodetectors, and the controller is electrically connected to the plurality of individually addressable photodetectors through the plurality of address lines for reading the electric signals.

13. The detection method according to claim 9, wherein the plurality of individually addressable photodetectors remain in an activated state during an operation of the lidar device.

* * * * *